United States Patent [19]

Jones et al.

[11] Patent Number: 5,490,809
[45] Date of Patent: Feb. 13, 1996

[54] SYSTEM AND METHOD FOR TEXTURING MAGNETIC DATA STORAGE DISKS

[75] Inventors: Oliver D. Jones, Santa Cruz; Donald E. Stephens, Westlake Village, both of Calif.

[73] Assignee: Oliver Design, Inc., Scotts Valley, Calif.

[21] Appl. No.: 234,778

[22] Filed: Apr. 28, 1994

Related U.S. Application Data

[62] Division of Ser. No. 842,695, Feb. 27, 1992.

[51] Int. Cl.⁶ ................................................. B24B 57/02
[52] U.S. Cl. ............................................ 451/60; 451/446
[58] Field of Search ........................ 451/446, 60, 63, 451/210, 302, 307, 59

[56] References Cited

U.S. PATENT DOCUMENTS

| | | | |
|---|---|---|---|
| 2,069,261 | 2/1937 | Monnet | 451/446 |
| 2,819,569 | 1/1958 | Angenieux | 51/263 |
| 2,839,877 | 6/1958 | Boettcher | 51/131 |
| 3,162,986 | 12/1964 | Oliveri | 451/446 |
| 3,500,591 | 3/1970 | Gawronski | 451/60 |
| 4,287,225 | 9/1981 | Kneller et al. | 427/48 |
| 4,393,628 | 7/1983 | Ottman et al. | 51/281 SF |
| 4,513,894 | 4/1985 | Doyle et al. | 451/446 |
| 4,671,018 | 6/1987 | Ekhoff | 51/145 T |
| 4,698,251 | 10/1987 | Fukuda et al. | 428/64 |
| 4,735,840 | 4/1988 | Hedgcoth | 428/65 |
| 4,964,242 | 10/1990 | Ruble et al. | 51/144 |
| 4,973,496 | 11/1990 | Kruger et al. | 427/129 |
| 5,012,618 | 5/1991 | Price et al. | 51/140 |
| 5,167,096 | 12/1992 | Eltoukhy et al. | 51/281 SF |

FOREIGN PATENT DOCUMENTS

| | | | |
|---|---|---|---|
| 54-23294 | 2/1979 | Japan | 51/88 |
| 61-197162 | 9/1986 | Japan | |
| 1-140958 | 6/1989 | Japan | 51/281 SF |
| 3-3765 | 1/1991 | Japan | 51/281 SF |

*Primary Examiner*—Robert A. Rose
*Attorney, Agent, or Firm*—Skjerven, Morrill, MacPherson, Franklin & Friel; David E. Steuber

[57] ABSTRACT

In the texturing unit of this invention a data storage disk is gripped between a pair of opposed, counter-rotating cylindrical abrasive mandrels, which are covered with soft, porous pads. The frictional force between the disk and the pads raises the edge of the disk against a pair of driven rollers which impart a rotational motion to the disk. A texture pattern of uniform grooves, having controlled peak heights and valley depths, is formed simultaneously on both sides of the disk. A system for delivering an abrasive slurry to the pads includes a closed loop in which the slurry is recirculated and a dispense section of that loop, from which a blast of pressurized air periodically expels the slurry through applicators and onto the pads. The continuous recirculation of the slurry prevents settling.

A unique feature is that the groove length may be controlled by adjusting the ratio between the rotational speeds of the disk and mandrels. The groove pattern is primarily circular but a radial component may be added by varying the position at which the pads contact the surfaces of the disk.

10 Claims, 12 Drawing Sheets

(CLOSED POSITION)

2

SYSTEM AND METHOD FOR TEXTURING MAGNETIC DATA STORAGE DISKS

This application is a division of application Ser. No. 07/842,695, filed Feb. 27, 1992.

FIELD OF THE INVENTION

This invention relates to the media used in disk drives and in particular to systems and methods of providing a texture on a magnetic data storage disk.

BACKGROUND OF THE INVENTION

Most high capacity disk drives used in computer systems employ thin film magnetic media for storing binary encoded data. In a typical disk drive, a magnetic disk is rotated at a high speed about a central axis and the data are written and read by a magnetic head. In storing and retrieving data from the magnetic storage disk, the magnetic read/write head typically rides on a thin cushion of air as it moves among the data tracks along the surface of the rapidly spinning disk.

In many disk drives, the head rests on the surface of the disk when the drive is turned off. When the disk starts spinning, the head slides along its surface for some distance until the disk reaches a rotational speed at which the head becomes airborne. The reverse process takes place when the disk is brought to a stop. This sliding contact between the head and the disk may result in damage to the disk and therefore, to reduce wear and friction, a thin film of lubricant is normally applied to the disk surface.

Problems of stiction may also occur. If the disk topography is too smooth, the head will "weld" to the surface while the disk is at rest, and if the lubricant film is too thick, the surface energy of the film will "bond" the head to the disk surface.

It has been found that these problems are minimized if a texture of very fine grooves, separated by ridges, is created by abrasion on the surface of the disk. The grooves may act as reservoirs for the lubricant so that it can be replenished as it is worn off by contact between the head and the ridges, and they overcome stiction by preventing the head from coming into contact with a continuous flat surface of the disk when it is at rest. The texture is normally formed in a hard layer of nickel-phosphorous material which overlays the relatively soft aluminum substrate of the disk, and the texture is perpetuated as additional thin film layers, including the magnetic layer, are deposited on the hard layer.

A large number of texture patterns are possible, ranging from one extreme, in which all of the grooves are concentric circles about the axis of the disk, to the other extreme, in which all of the grooves are oriented radially to the axis of the disk. The direction of the grooves is important in achieving optimum performance, since the grooves may affect the direction of easy magnetization and the magnitude of the coercive force.

For certain thin film magnetic alloy compositions, the anisotropy in magnetic characteristics which is caused by the grooves benefits performance, particularly for high density recording. For these compositions, circular grooves tend to yield higher coercivities in the circumferential direction. This is an advantage, as it is in the rotational direction of the head where the highest number of flux changes per inch are desired. Moreover, the lower coercivity in the radial direction minimizes "off track" noise. On the other hand, purely circular grooves may increase the extent of wear as the head slides on the ridges, while bit shift or phase margin defects may result if the grooves have too large a radial component. For these reasons, the present view is that a pattern which includes primarily circular grooves with a small radial component is desirable.

Whatever pattern of grooves is selected, it is important that the texture be extremely uniform. Surface asperities will cause glide problems and may cause failure in start-stop cycle tests.

Several types of texturing systems are known, generally classified as "fixed abrasive" or "slurry abrasive". Fixed abrasive processes typically use abrasives bonded to a mylar tape. The disk to be textured is clamped at its inside circumference, and rotated. The tape is supported by a cylindrical surface and pressed against the disk. While this system allows both sides of the disk to be textured simultaneously, it is subject to several disadvantages. First, relatively large clamping and rotational forces are applied, normally at the central aperture of the disk, because the abrasive tape is acting as a "brake" on the surface of the disk. These large forces may cause distortion of the disk, particularly with the thinner substrates now being introduced. Second, many abrasives are not available in tape form, and some abrasives and pad combinations that are available, such as diamond, are prohibitively expensive. Third, problems with texture uniformity, imbedding, asperities, etc. sometimes require the use of two-step tape processes. This increases the cost.

There are two types of abrasive slurry machines: units which employ a pad mounted on a rotating quill wheel, and units which are similar to the tape machine but use a cloth tape. In both types, a free abrasive slurry is sprayed onto the surface of the disk. These systems allow a wider choice of abrasives and tend to offer a less expensive texture process. Moreover, a large selection of pad materials is available for the rotating quill units. On the other hand, the rotating quill units cannot texture both sides of a disk simultaneously, are difficult to automate, and require frequent pad replacement. The cloth tape units require the disk to be firmly clamped, and the selection of cloth "tapes" is extremely limited. In any slurry machine, the abrasive particles in the slurry may settle or agglomerate into larger particles, particularly in the slurry supply lines.

SUMMARY OF THE INVENTION

The system of this invention allows both sides of a disk to be textured at the same time. It provides a uniform circumferential texture pattern with some radial component. It further allows the size of the radial component to be varied. No strong clamping forces are imposed on the disk, and there are no lines or reservoirs in which the slurry may settle. Repeated cleanings of the texturing pad after each disk has been processed prolongs the life of the pad and permits it to be used for numerous texturing cycles.

In a system according to this invention, a disk is sandwiched between two opposing cylindrical mandrels, typically oriented with their axes horizontal. The mandrels make contact with elongated regions on both sides of the disk which extend substantially between two points on the outer circumference of the disk. Frequently, the contact regions will include a diameter of the disk. The surfaces of the mandrels contain an abrasive. Preferably, the mandrels are covered with soft removable pads, and the abrasive is applied in the form of a slurry near the contact regions between the pads and the disk.

A means is provided for maintaining the disk in a fixed position between the mandrels while imparting a rotational movement to the disk. In a preferred embodiment, this rotational means comprises two drive rollers which are positioned above the disk and make contact with the outer edge of the disk when it is lifted upward.

The two opposing mandrels are rotated in opposite directions so as to exert an upward frictional force in their region of contact with the disk. This lifts the disk upward until its edge contacts the two drive rollers, which impart a rotational motion to the disk. When this has occurred, the disk is abraded in a generally upward direction by the abrasive particles on the texturing mandrels as it is being rotated by the drive rollers. The result is a texture pattern which is largely circular but contains radial components.

According to another aspect of the invention, when the texturing process is completed, a pair of brushes or other conditioning or cleansing means scrubs the texturing mandrels as they are moved apart to release the disk. Water may be sprayed onto the texturing mandrels at the same time to assist the scrubbing process.

According to another aspect of the invention, an abrasive slurry is applied to the disk or the texturing mandrels. A slurry reservoir and a pump are connected into a closed slurry recirculation loop. A pair of slurry feed lines are connected to respective points in the recirculation loop, defining a dispense section, and extend to slurry applicators (e.g., nozzles) which are positioned on either side of the disk. An air supply line, which runs from a source of pressurized air, is connected to the slurry recirculation loop at a point in the dispense section.

When slurry is not being applied to the disk or rollers, valves in the feed lines and the air supply line are closed. When the slurry is to be applied, these valves are opened, and one or more valves located elsewhere in the slurry recirculation loop are closed. As a result, high pressure air flows through the air supply line and enters the recirculation loop, forcing slurry that is located in the dispense section into the feed lines and through the applicators.

The air continues to flow until all of the slurry has been expelled from the feed lines and applicators. When this has happened, the valves in the air supply line and the feed lines close, and the valves in the recirculation loop open. The pump then recirculates the slurry continuously through the recirculation loop again.

DESCRIPTION OF THE INVENTION

Figure 1:
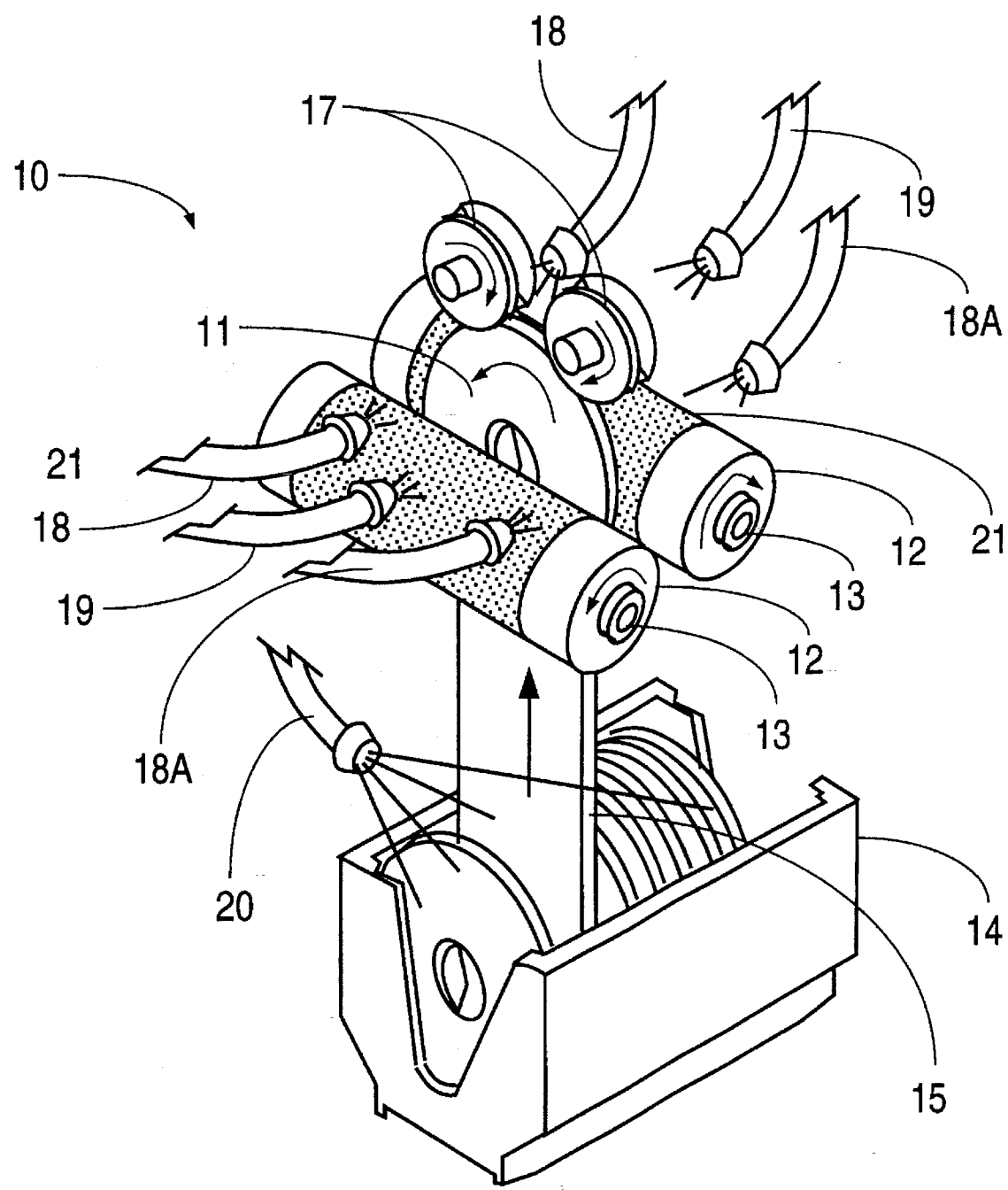
FIG. 1 illustrates in perspective a disk texturing unit in accordance with the invention.
Figure 2:
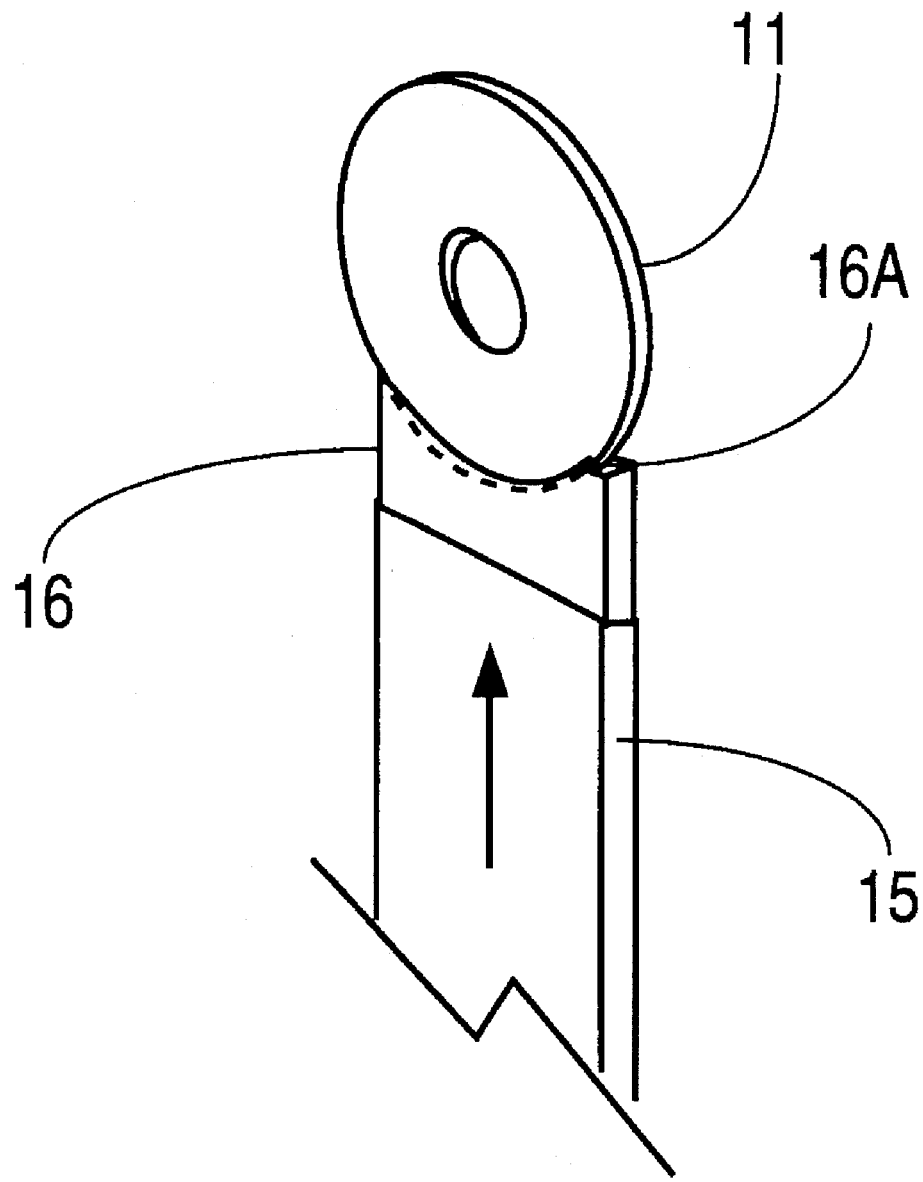
FIG. 2 illustrates the disk lifter.

A perspective view of a disk texturing unit in accordance with the invention is illustrated in FIG. 1. In disk texturing unit 10, a disk 11 is sandwiched between a pair of cylindrical texturing mandrels 12 which are driven to rotate in opposite directions about shafts 13 by a driving means (not shown). As shown in FIG. 1, disk 11 has been lifted from a cassette 14, containing other disks, by a disk lifter 15. As shown in FIG. 2, a lifter edge holder 16 is mounted on disk lifter 15, and lifter edge holder 16 engages a circumferential edge of disk 11 thereby lifting disk 11 into the position shown in FIG. 1. A V-shaped groove 16A in edge holder 16 grips the edge of disk 11 and holds it upright. Disk lifter 15 is actuated by a drive means which is not illustrated in FIGS. 1 and 2.

FIG. 1 shows disk 11 after it has been lifted to its upper limit, where a circumferential edge of disk 11 makes contact with a pair of drive rollers 17. Also shown in FIG. 1 are a pair of nozzles 18, which direct a stream or spray of a water-based abrasive slurry into the region of disk 11 and mandrels 12, a pair of nozzles 18A for spraying a lubricant, and a pair of nozzles 19 for spraying additional solutions to rinse disk 11. A nozzle 20 sprays a solution to keep the disks in cassette 14 wet. Mandrels 12 are covered with soft, porous pads 21, which are the elements which actually make contact with the surfaces of disk 11. The slurry is preferably sprayed from nozzles 18 onto disk 11 but may alternatively be sprayed onto pads 21 or both disk 11 and pads 21.

Figure 3A:
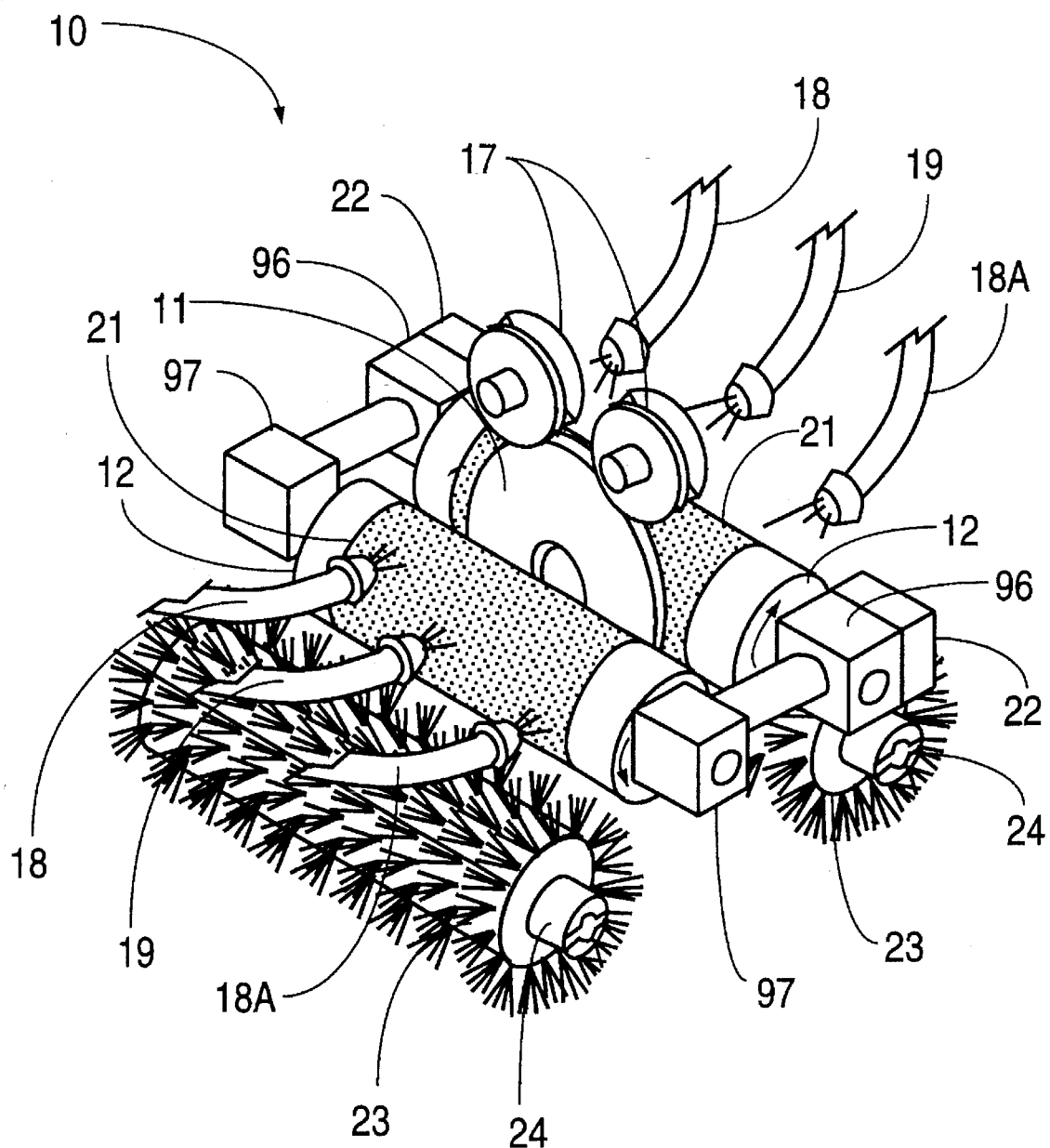
FIG. 3A is a perspective view similar to FIG. 1 illustrating the pad cleaning brushes.
Figure 3B:
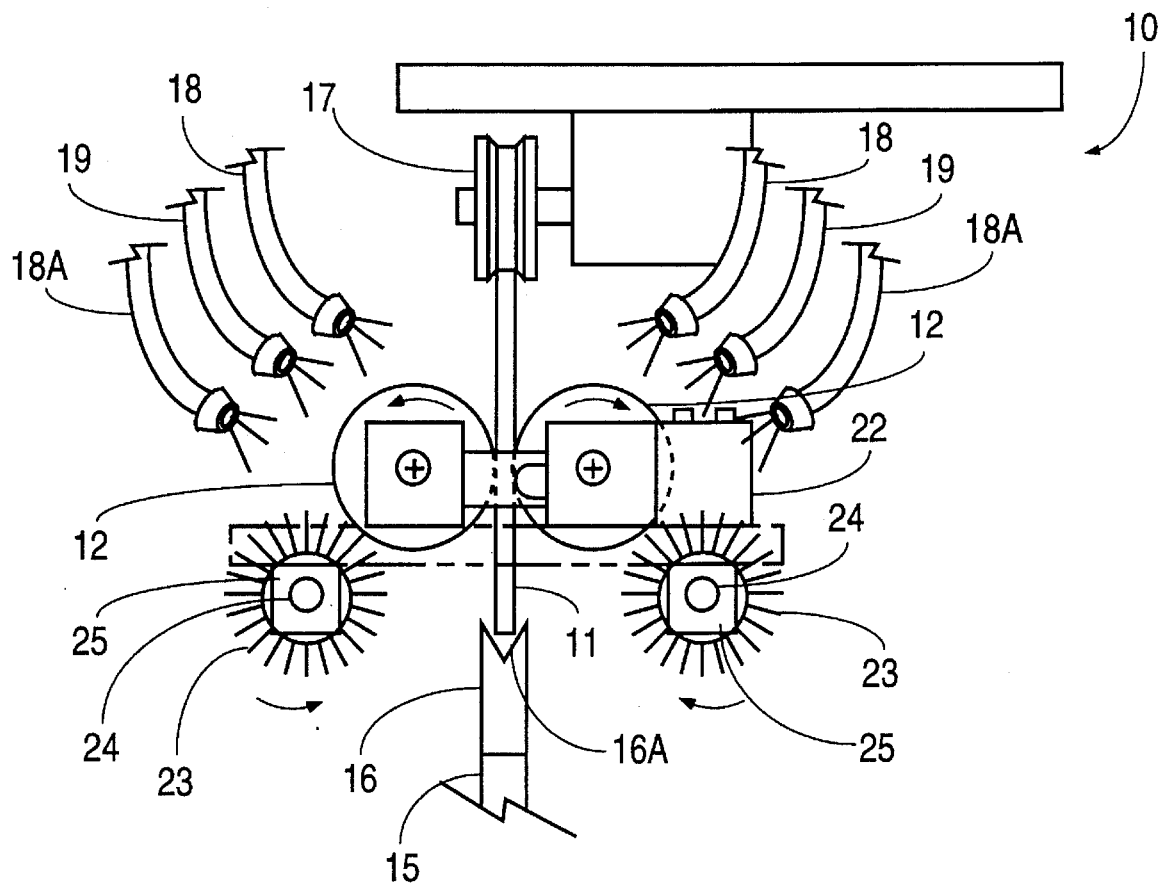
FIG. 3B is a front elevational view of the structure shown in FIG. 3A.

Several additional components of texturing unit 10 are illustrated in FIGS. 3A and 3B, which are perspective and front elevational views, respectively, of texturing unit 10. A pair of mandrel position control mechanisms 22 include bearings 96 and 97 into which the ends of shafts 13 are journaled. Mechanisms 22 control the positions of mandrels 12 with respect to disk 11, alternately separating mandrels 12 from disk 11 or urging mandrels 12 towards each other so that they exert equal opposing forces against the sides of disk 11. In their closed position, mechanisms 22 also control the pressure applied by mandrels 12 to disk 11. A pair of brushes 23 are mounted on shafts 24, the ends of which are inserted into bearing blocks 25 (see FIG. 3B). Brushes 23 are positioned such that they engage pads 21 when mandrels 12 are separated by mechanism 22.

Texturing unit 10 operates in the following sequence. Initially, disk 11 is in cassette 14, and mandrels 12 are held motionless in a separated condition by mechanism 22. The texturing process starts when disk lifter 15 engages disk 11 and lifts it out of cassette 14 to a position between mandrels 12. When disk 11 has been lifted to the point where its center is substantially between mandrels 12, mechanism 22 causes mandrels 12 to close against disk 11 and also ensures that mandrels 12 apply equal pressures of a predetermined magnitude against the surfaces of disk 11. Disk 11 is contacted by pads 21. The drive means (not shown) then begins to rotate mandrels 12 in opposite directions so that a frictional force between pads 21 and the surfaces of disk 11 urges disk 11 upward. At about the time mandrels 12 began to rotate, a lubricant is sprayed through nozzles 18A onto pads..21 to assist in maintaining a constant lubricant/water ratio on pads 21 following their cleansing (described below).

Figure 3C:
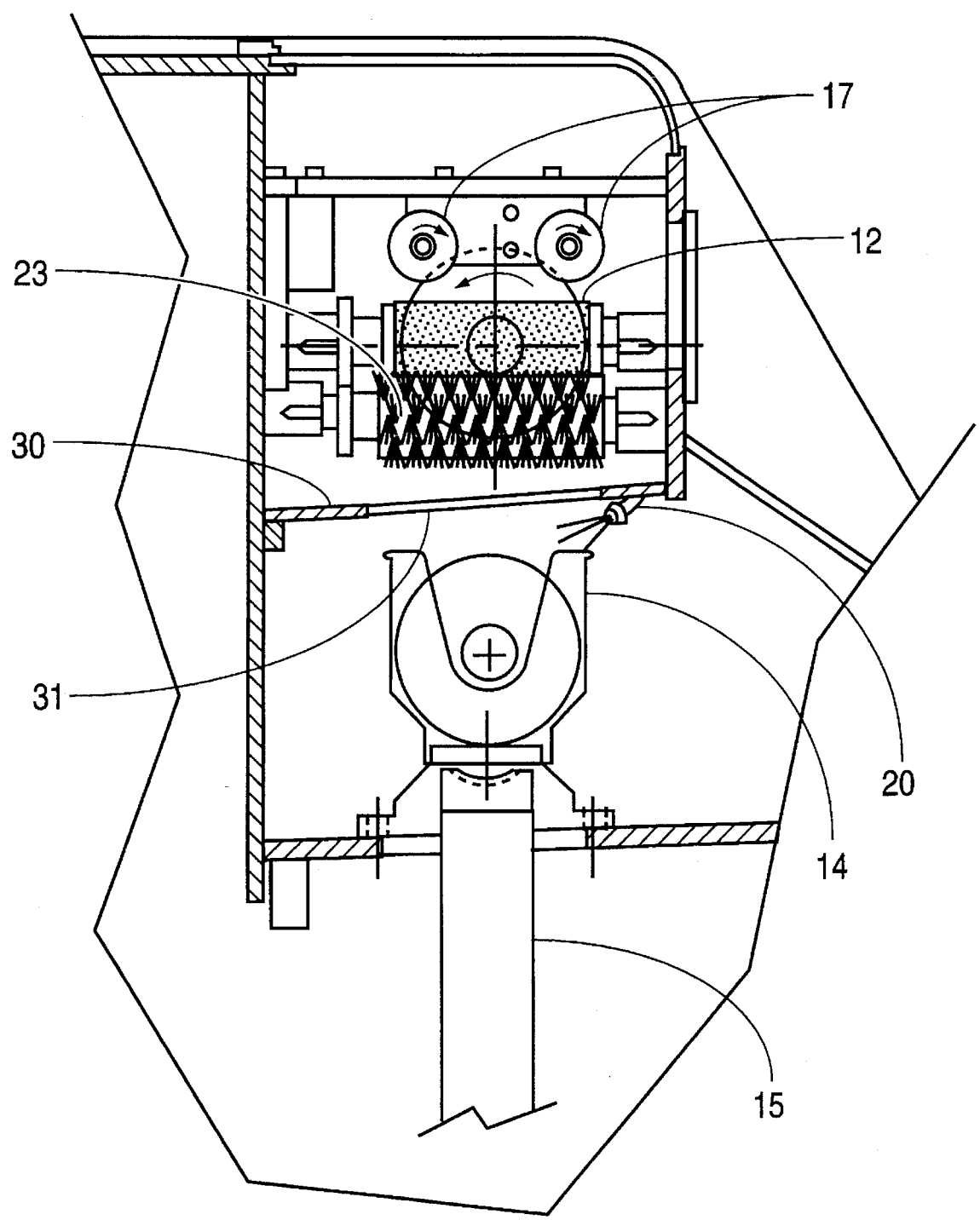
FIG. 3C is a side elevational view of the structure shown in FIG. 3A.

An upper edge of disk 11 contacts rollers 17, which are driven to rotate in the same direction. Rollers 17 therefore cause disk 11 to rotate (counterclockwise in FIGS. 1–3). It should be noted that the position of disk 11 when it contacts rollers 17 is slightly (e.g., 0.25 inches) above its position immediately after the upward stroke of disk lifter 15 is completed. Thus, the lower edge of disk 11 is not in contact with disk lifter 15 as disk 11 is rotated by rollers 17.

It will be evident that a system of more than two rollers (or belts, etc.) could be substituted for rollers 17, and that only one of the rollers need be driven.

Simultaneously with the engagement of disk 11 with mandrels 12 and rollers 17, an abrasive slurry is sprayed through nozzles 18 onto the surfaces of disk 11. The slurry clings to (and to some .extent is absorbed into) pads 21 and causes the surfaces of disk 11 to be abraded as mandrels 12 rotate. At the same time disk 11 is rotated by rollers 17, so a texture is formed by the abrasive over the entire surface of disk 11.

In the embodiment of FIGS. 1–4, mechanism 22 on the near side (facing the viewer) closes just before mechanism 22 on the far side. This causes mandrels 12 to grip the right side of disk 11 first, and starts disk 11 rotating in a counterclockwise direction. Thus, disk 11 is already rotating to some extent before it engages rollers 17, which accelerate its rotation in that direction. Alternatively, mandrels 12 may be tapered slightly (large end facing the viewer) to impart a continuous counterclockwise motion to disk 11 and thereby assist rollers 17.

Disk 11 is texturized (abraded) for a predetermined period of time, for example 10 seconds. When the texturizing process is complete, rinse water is sprayed through nozzles 19 for about 3 seconds. Mandrels 12 then stop rotating and mechanisms 22 cause mandrels 12 to separate, thereby releasing disk 11. Disk 11 falls onto disk lifter 15 again, which lowers it into cassette 14.

When mandrels 12 separate, they begin to rotate again and engage brushes 23 (see FIG. 3B). Each of brushes 23 is rotated in the same direction as the mandrel 12 which it contacts. Thus, brushes 23 scrub the remaining abrasive particles from pads 21, and at the same time rinse water is sprayed through nozzles 19. The cleansing process normally takes about two seconds and when it is finished mandrels 12 and brushes 23 stop rotating. Mandrels 12 are then ready for the next disk to be textured.

When mandrels 12 engage the next disk, most of the abrasive has been scrubbed from pads 21 and they are in a relatively clean condition. This is important because, as will be described later, uniformity of texturing requires that a controlled amount of slurry (and abrasive) be used to texture each disk.

To help protect the disks in cassette 14 from slurry which drips from the mandrels 12 or disk 11, a cover 30 (shown in FIG. 3C) may be provided, with a slot 31 to allow movement of disk lifter 15. In addition, a solution is sprayed through nozzle 20 to keep the disks in cassette 14 wet, and this spraying action also tends to remove any abrasive particles which might collect on the disks in cassette 14.

FIGS. 4A–4E illustrate the construction of one of mandrel position control mechanisms 22. Shoulder bolts 103 are fitted through slots formed in a supporting member 104 and into holes tapped into the bottom of bearings 96 and 97, respectively. Accordingly, bearings 96 and 97 are free to move towards and away from one another. Bearing 97 is attached to the end of a shaft 98, which extends to a piston 95A within an air cylinder 95. Shaft 98 has a slot 98A formed in it, through which the right hand shaft 13 extends. Air cylinder 95 is attached to bearing 96. Air cylinder 95 has air inlet ports 110 and 111.

When air is admitted to inlet port 111 (FIG. 4A), piston 95A is driven to the left, and bearing 96 is driven away from bearing 97 until shoulder bolts 103 reach the outside ends of the slots formed in supporting member 104. When air is admitted through inlet port 110, piston 95A is driven to the right, and bearing 96 and bearing 97 are pulled together until shoulder bolts 103 reach the inside ends of the slots formed in supporting member 104. The inside ends of slots 103 are placed such that maximum pressure is applied between pads 21 and disk 11 when shoulder bolts 103 are in this position. The pressure between pads 21 and disk 11 can be reduced by controlling the air flow through port 110 so as to prevent shoulder bolts 103 from reaching their innermost positions.

Figure 4A:
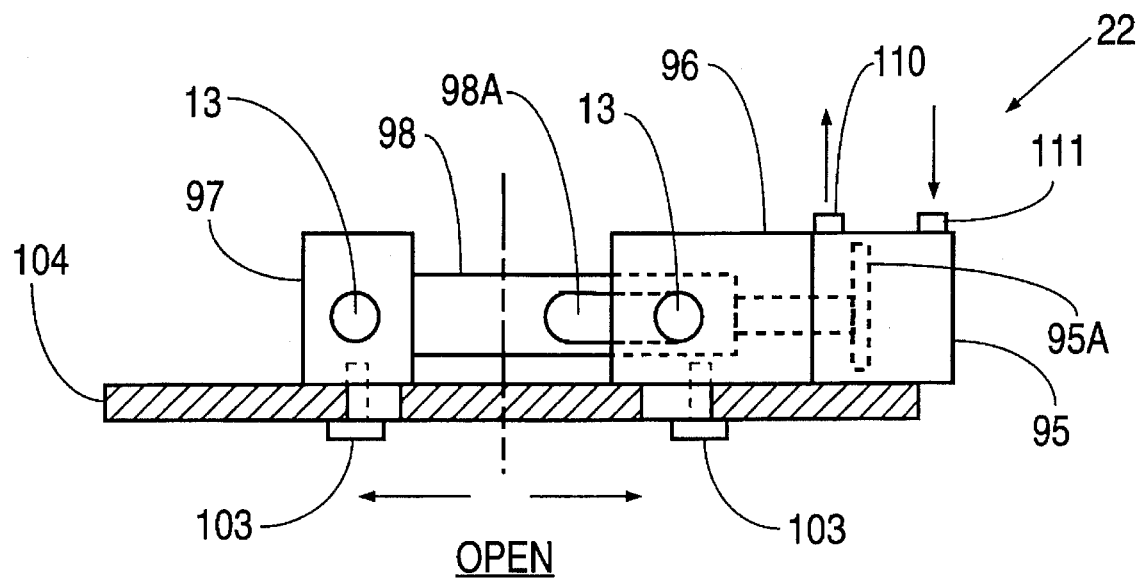
FIGS. 4A and 4B are front views of the mandrel position control mechanism in open and closed positions, respectively.
Figure 4B:
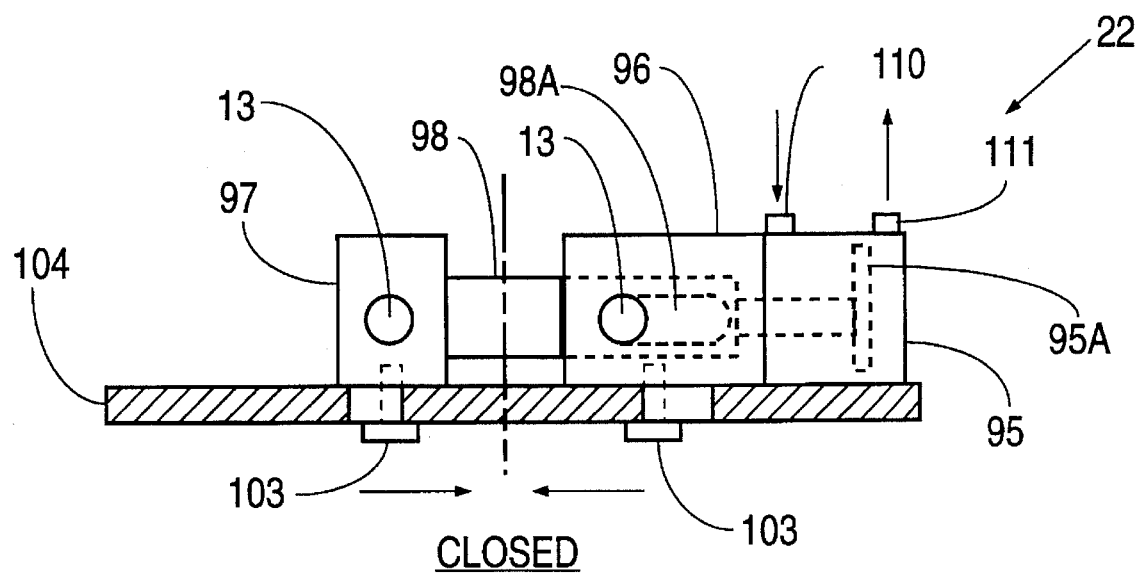
Figure 4C:
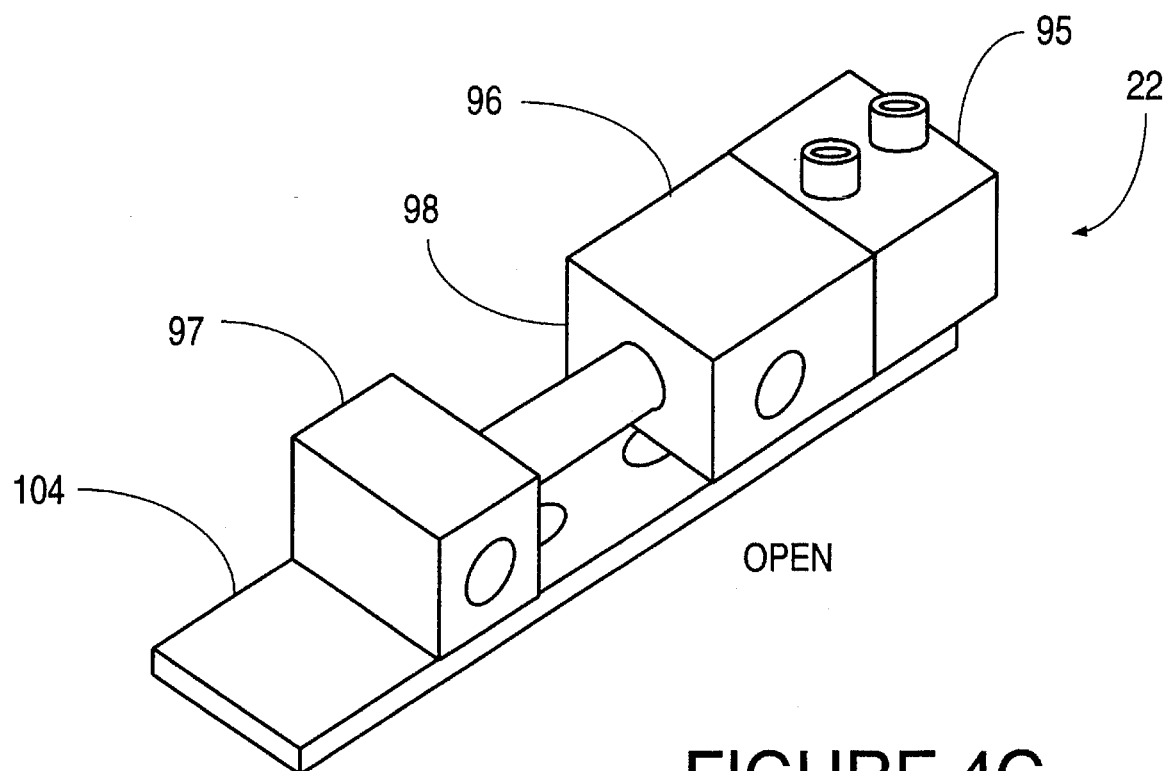
FIGS. 4C and 4D are perspective views of the mandrel position control mechanism in open and closed positions, respectively.
Figure 4D:
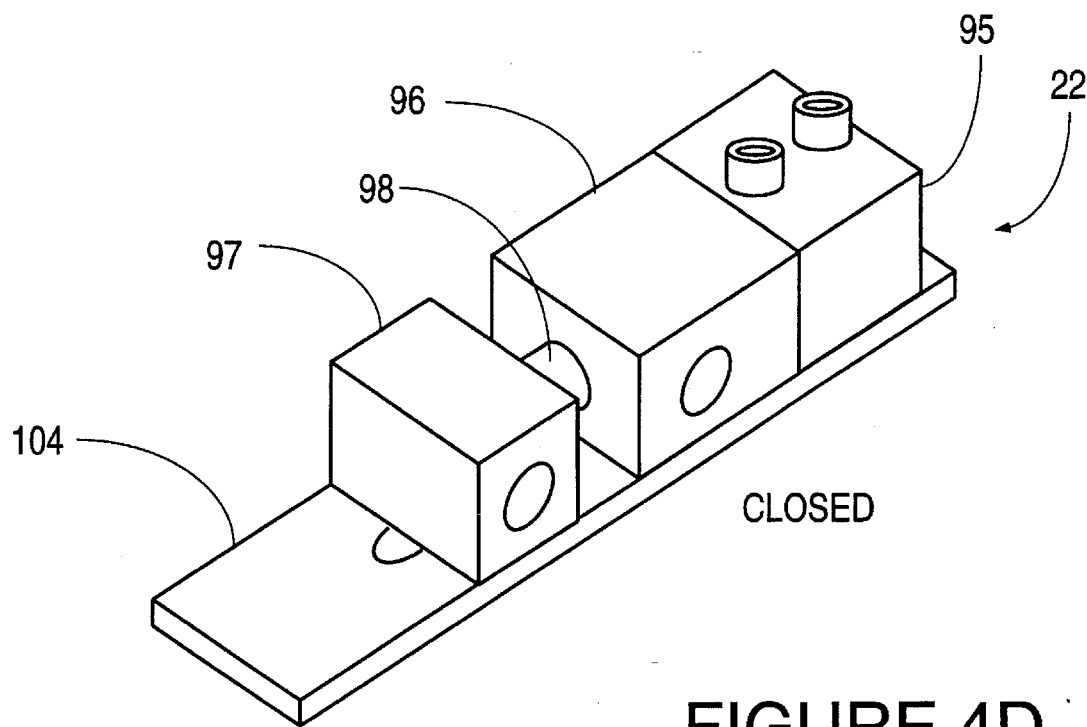
Figure 4E:
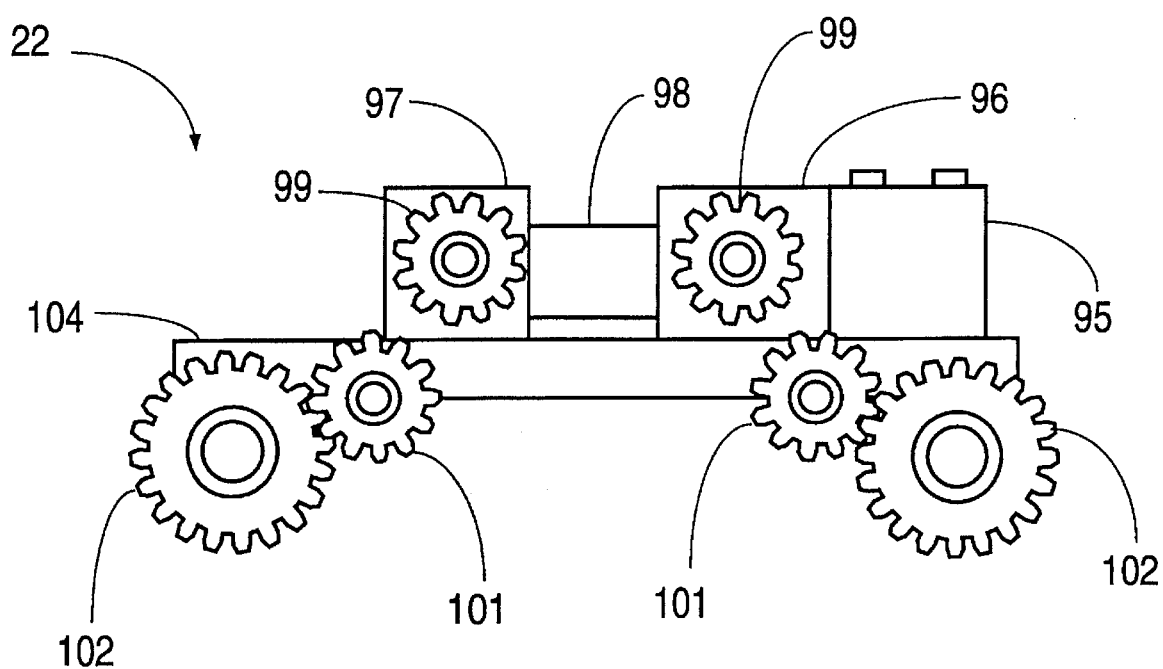
FIG. 4E illustrates the drive mechanism for the cleaning brushes.

FIG. 4E illustrates a drive mechanism for rotating the cleaning brushes 23 when mandrels 12 are in their open position. Shafts 13 are attached to respective drive gears 99. A pair of idler gears 101 are mounted such that they engage gears 102 which are mounted on shafts 24. When mechanism 22 is in its closed position, gears 99 do not engage gears 101, and brushes 23 remain motionless. When mechanism 22 is in its open position (not illustrated in FIG. 4E), gears 99 engage idler gears 101, thereby driving shafts 24 and brushes 23 in a rotational direction the same as that of mandrels 12. Gears 99, 101 and 102 are sized such that brushes 23 make contact with pads 21 when the gears are engaged.

Figure 5A:
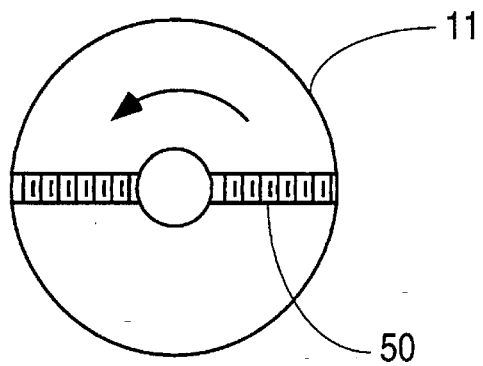
FIGS. 5A, 5B and 5C illustrate the contact region between a texturing mandrel and a disk in three possible configurations, respectively.

As noted above, pads 21 are soft and porous, and the pressure which mechanisms 22 cause to be applied between mandrels 12 and disk 11 can be adjusted. As a result, the region of contact between pads 21 and disk 11 can be varied, and this in turn alters the texture pattern on disk 11. This is illustrated in FIG. 5A and (in a somewhat exaggerated fashion) FIG. 5B. Regions 50 and 51 represent the region of contact between disk 11 and one of mandrels 12 when mechanisms 22 have been adjusted to apply different pressures between mandrels 12 and disk 11. It will be apparent that region 50 represents a smaller pressure than region 51. In a normal situation the width of the contact region is about 3/16 inch.

Figure 5B:
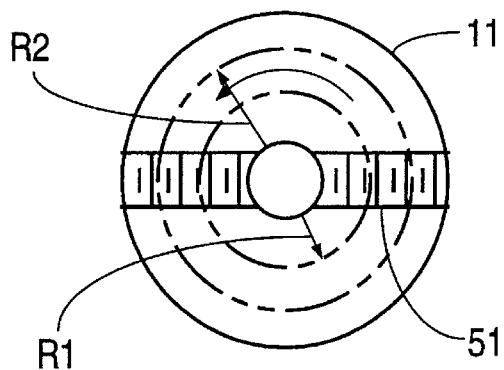

Texturing unit 10 is adjusted so that the surfaces of pads 21 are moving considerably faster than the surfaces of disk 11. Thus, each abrasive particle is trapped between pads 21 and disk 11 at the lower extremity of a contact region and forms a groove as it moves to the upper extremity of the contact region. Referring to FIGS. 5A and 5B, it is apparent that a pattern of grooves in region 1 will depart more from a purely circular orientation than a pattern of grooves in region 50. Thus, the texture pattern formed under the conditions shown in FIG. 5A will be closely circular, while the texture pattern formed under the conditions shown in FIG. 5B will have a larger radial component. In general, the radial component will also increase as the rotational velocity of mandrels 12 is increased, and will be greater near the center of disk 11.

Figure 5C:
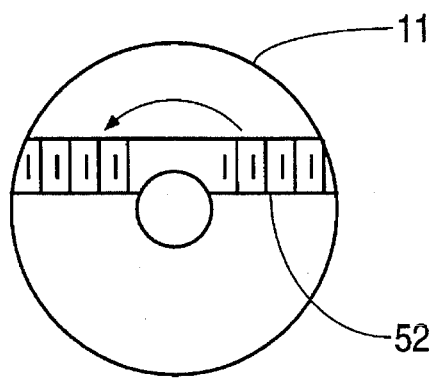

The radial component of the texture pattern may also be enhanced by raising or lowering the position of mandrels 12 with respect to disk 11. FIG. 5C illustrates a contact region 52 which might result from doing this. From the discussion above, it will be apparent that the texture pattern formed by the configuration illustrated in FIG. 5C will have a significant radial component.

Figure 6A:
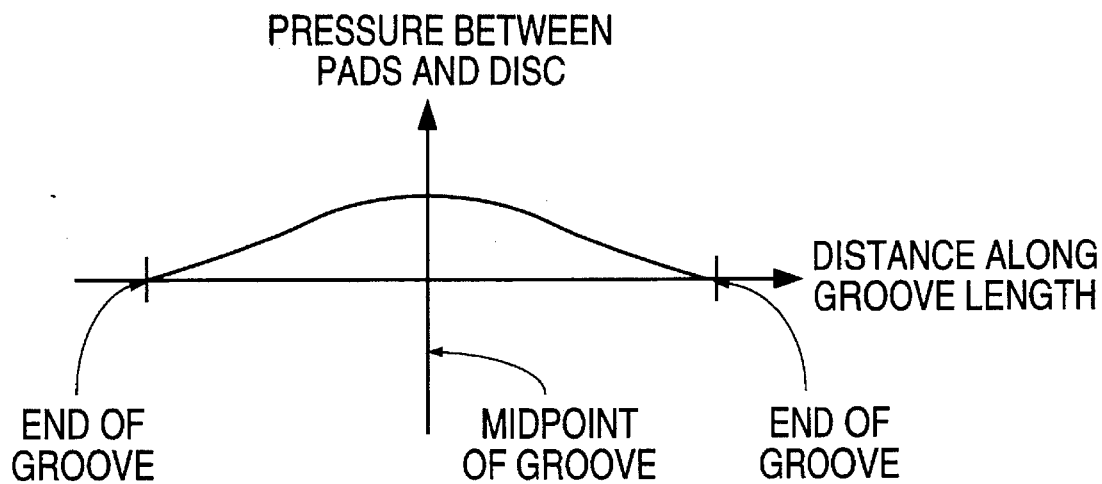
FIG. 6A illustrates the variation of pressure across the contact region.
Figure 6B:
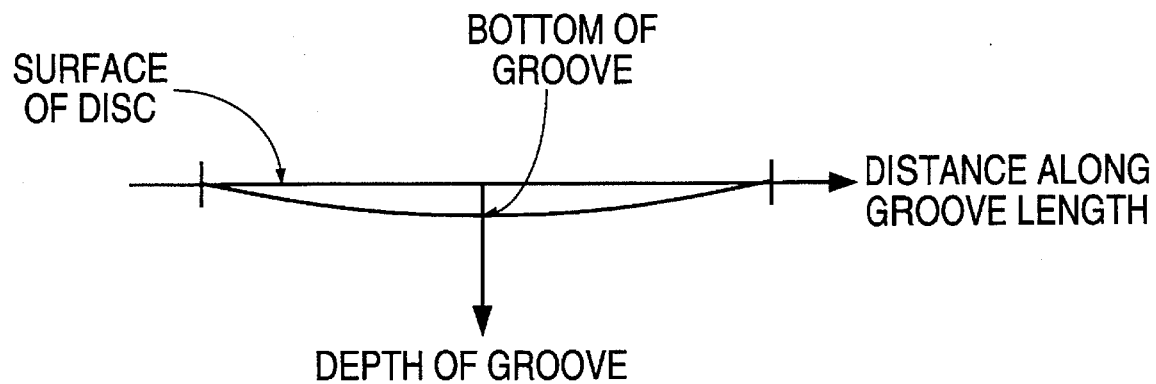
FIG. 6B is an illustrative cross-sectional view of a groove formed in a disk.

Several other aspects of the texture pattern formed by unit 10 are worthy of mention. As noted above, pads 21 slide relatively rapidly against the surfaces of disk 11. For example, in one embodiment mandrels 12 rotate at 500 rpm while disk 11 rotates at 200 rpm. As this rotation takes place, the abrasive particles on the surface of pads 21 contact disk 11 in the contact regions illustrated in FIGS. 5A–5C. In each instance, because soft pads 21 are deformed, the pressure between pads 21 and disk 11 increases from zero at one edge of a contact region to a maximum at the midpoint of the contact region, and falls to zero at the opposite edge of the contact region. This relationship is illustrated in FIG. 6A. As a result, the grooves formed by the abrasive particles in the surface of disk 11 have a depth which varies from zero at the ends of the groove to a maximum depth at the midpoint. This structure is illustrated in FIG. 6B, which is an illustrative view not drawn to scale.

It is thus apparent that the texture pattern formed on a disk by texturing unit 10 comprises a plurality of relatively short grooves (for example, less than 1.0 inch long) rather than longer grooves which extend for a significant angular distance around the center of the disk. This eliminates many of the problems which occur when a single abrasive particle contacts the disk surface for many revolutions (i.e., particle embedding, redeposition of removed material, asperities and gouges). The variation of abrasion pressure from the ends to the midpoint of each groove also minimizes many undesirable effects, such as embedding, and tends to give better groove uniformity over the disk surface. Moreover, since the rotational speeds of disk 11 and mandrels 12 are controlled separately, the length of grooves can be varied. In general, the length of the grooves is reduced by increasing the rotational velocity of mandrels 12 and reducing the rotational velocity of disk 11.

A further advantage is that pads 21 do not contact disk 11 except in relatively small contact regions such as those illustrated in FIGS. 5A–5C. As pads 21 rotate, most of their surfaces are exposed. This greatly extends the life of the pads as compared to the pads used with conventional quill wheel machines. The cleaning mechanism provided by brushes 23 further extends the life of pads 21.

The width of pads 21 on mandrels 12 may be reduced to any dimension so as to permit a specific region of disk 11, such as a landing zone, to be textured. Two or more texturing units, having pads at different positions of their respective mandrels, could be used to provide different texture patterns in different annular regions of the disk. This type of patterning is unique and may provide advantages to magnetic recording at higher densities.

No strong clamping forces are imposed on disk 11 by texturing unit 10. The upward frictional force provided by mandrels 12 is just sufficient to ensure firm contact between the edge of disk 11 and rollers 17. Neither this force nor the tangential force applied to the edge of disk 11 by rollers 17 is strong enough to cause any significant distortion of disk 11.

It is important that a precise measured amount of the abrasive slurry be applied through nozzles 18 during each texturing cycle, and that the slurry be well mixed. These factors, in conjunction with the cleaning of mandrels 12 between cycles, assure a uniform texturing of successive disks.

The slurry preferably contains abrasive particles of alumina, silicon carbide, diamond, etc. measuring from 0.2 to 20 microns, with 0.5 to 5 microns being highly preferred. It also contains water and a cutting lubricant selected for ease of cleaning and for producing an optimum surface finish. Water-diluteable formulations without hard-to-remove residues are desirable. Other ingredients such as surfactants and antimicrobial agents may be added to the slurry.

Figure 7:
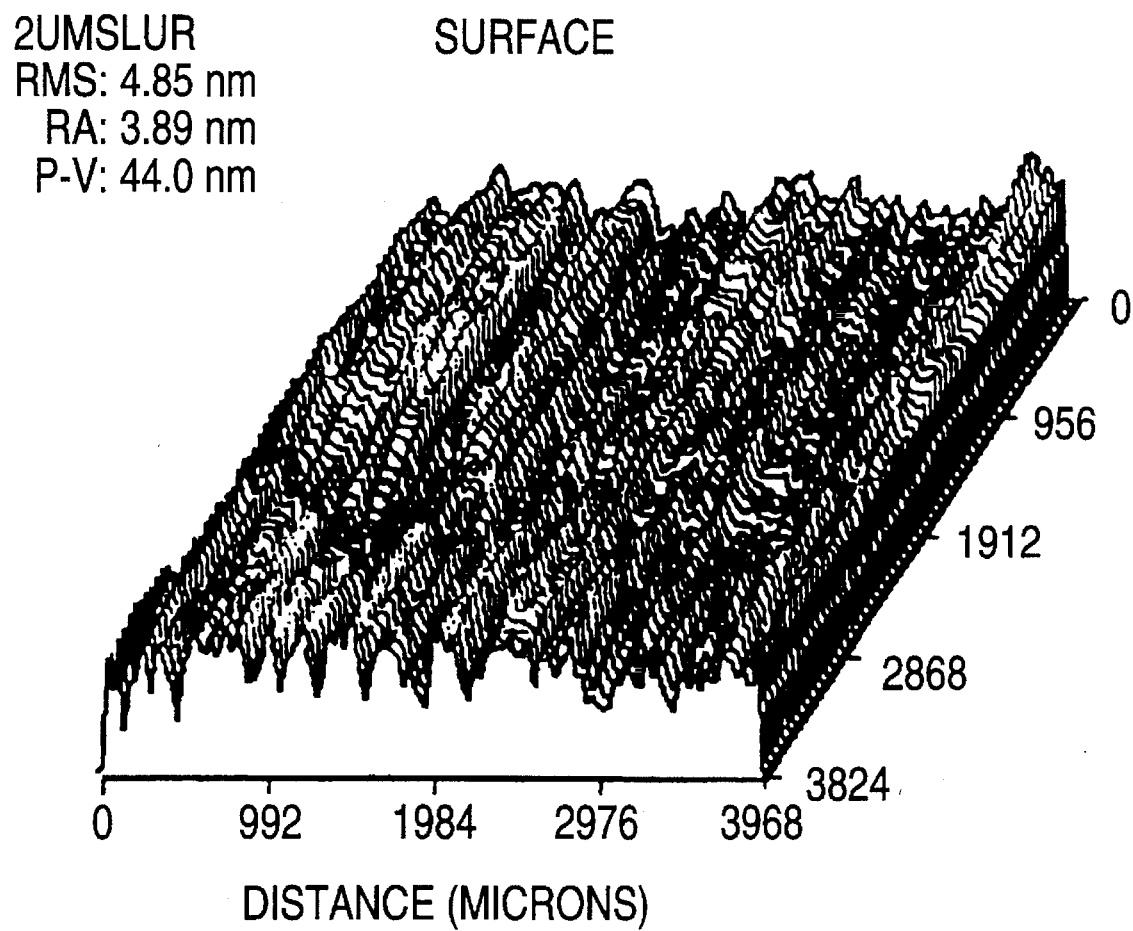
FIG. 7 illustrates a texture pattern in accordance with the invention.

FIG. 7 illustrates a texture pattern formed on a disk using a disk texturing unit in accordance with the invention. The texture pattern was measured with a Wyco surface profilometer.

The Appendix shows the results of a series of tests that were performed with the disk texturing unit. The disks used were 130 mm polished nickel disks, and a diamond slurry was used. The mandrels were 2.20 inches in diameter. The disk edge drive rollers were 1.44 inches in diameter. The pads with adhesive backing were bonded to the mandrels using pressures of about 30 psi.

Figure 8:
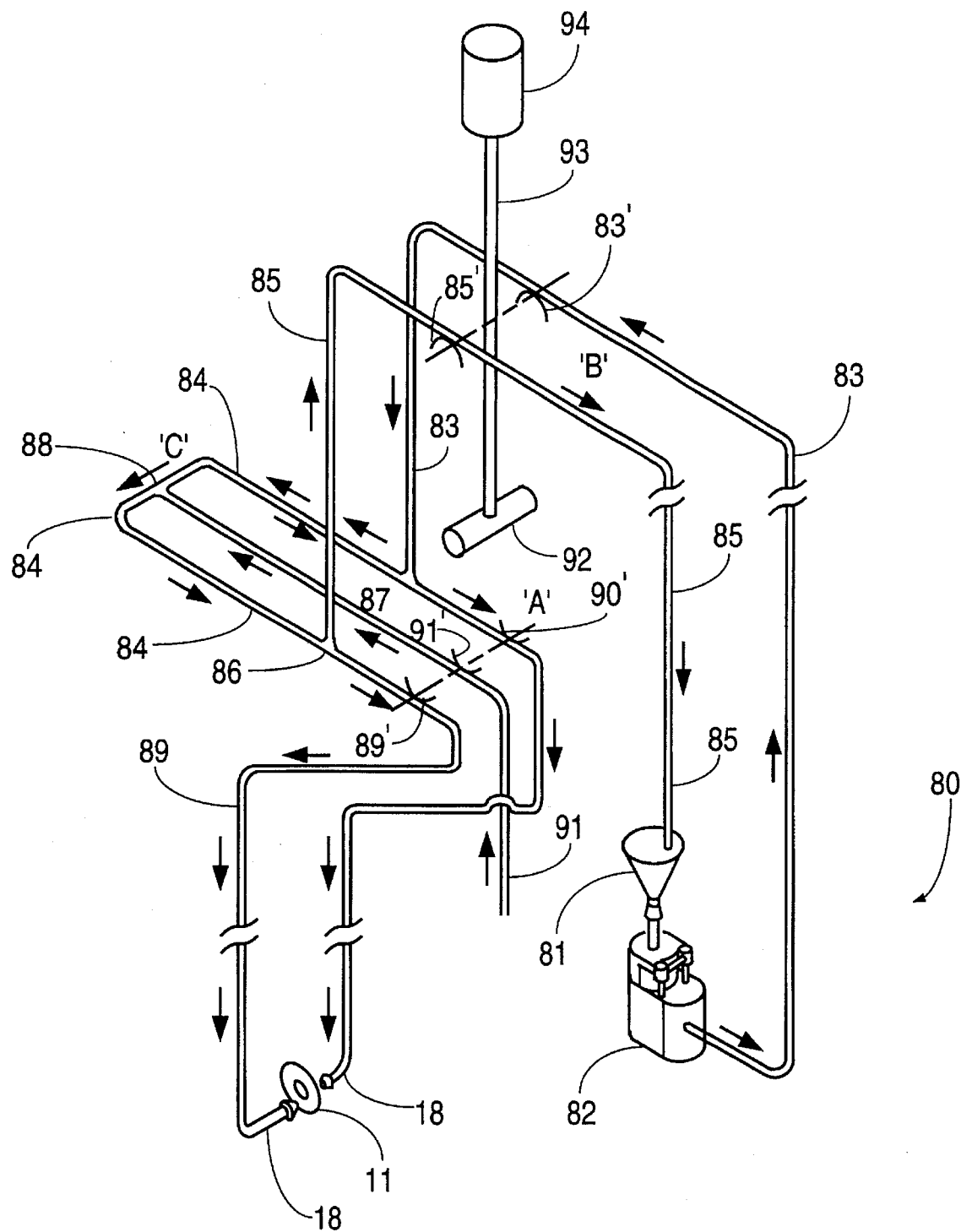
FIG. 8 illustrates schematically an abrasive slurry delivery system in accordance with another aspect of the invention.

FIG. 8 shows a system for providing a measured amount of a well-mixed slurry during each texturing cycle. Slurry delivery system 80 includes a cone-shaped reservoir 81 and a pump 82. Reservoir 81 and pump 82 are connected into a recirculation loop which includes an outflow line 83, a dispense section 84 and a return line 85. Dispense section 84 is defined by junction points 86 and 87 on either end and includes a junction point 88 at its midpoint. Slurry feed lines 89' and 90 extend from junction points 86 and 87, respectively, and are connected to slurry nozzles 18. An air supply line 91 extends from a source of pressurized air (not shown) to junction point 88. Each of lines 83 and 85, feed lines 89 and 90, and air supply line 91 contains a section of soft plastic or rubber tubing which can readily be pinched so as to close off flow These pinch valves are labeled 83', 85', 89', 90' and 91' in FIG. 8. Pinch valves 83' and 85' are situated above a pinch bar 92, and pinch valves 89', 90' and 91' are situated below pinch bar 92. Hard surfaces are provided adjacent valves 83', 85' and 89'–91' on the sides opposite to pinch bar 92. Pinch bar 92 is connected by a connecting rod 93 to an actuator 94, which is capable of lifting and lowering pinch bar 92 so that it alternately closes valves 83' and 85', or valves 89', 90' and 91'.

Initially, pinch bar 92 closes valves 89', 90' and 91' and therefore prevents flow from occurring in slurry feed lines 89 and 90 and air supply line 91. An abrasive slurry is added to reservoir 81 and is circulated by pump 82 through outflow line 83, dispense section 84 and return line 85. As long as pinch bar 92 remains in this position, the slurry will be continuously circulated, and pump 82 is sized so that the flow characteristics (Reynolds number, etc.) maintain the abrasive particles in suspension.

When it is desired to dispense slurry through nozzles 18, pinch bar 92 is lifted by actuator 94 to close pinch valves 83' and 85', thereby closing off flow in outflow line 83 and return line 85. At the same time, pinch valves 89'–91' are opened. Pressurized air therefore flows through air supply line 91 to junction point 88, where it forces the abrasive slurry in dispense section 84 on either side of junction point 88 through feed lines 89 and 90 and nozzles 18. The timing of actuator 94 is set such that air continues to flow until the slurry is entirely expelled from feed lines 89 and 90 and nozzles 18. Pinch bar 92 then returns to its lower position, closing off lines 89, 90 and 91. The air flow in line 91 is terminated, and no further flow of air or slurry may occur in feed lines 89 and 90. The slurry again circulates through lines 83 and 85 and dispense section 84. Pump 82 normally need not be shut off when pinch valves 83' and 85' are closed because these valves are closed only during the dispense cycle, which lasts only a few seconds.

Since no slurry remains in lines 89 and 90, the volume of slurry dispensed during each texturing cycle is determined by the volume in dispense section 84 between central junction point 88 and junction points 86 and 87, respectively. The volume of slurry dispensed can therefore easily be adjusted by varying the lengths of these segments. Otherwise, a consistent volume of slurry will be delivered during each texturing cycle. Moreover, since feed lines 89 and 90 and nozzles 18 are emptied after each cycle, all of the slurry in the system is continuously recirculated and no settling can occur. The relatively short time periods during which the slurry is being expelled from dispense section 84 are not long enough to allow settling in the remainder of the recirculation loop. Therefore, the slurry remains a homogeneous, uniform mixture and no large, agglomerated abrasive particles can form to create problems in the texturing process.

Texturing unit 10 and slurry delivery system 80 may be used together in a disk texturing system which overcomes all of the problems mentioned above. Numerous alternative embodiments of the structures disclosed herein will be apparent to those skilled in the art. The above disclosures are therefore intended to be illustrative only, and not limiting, and the broad principles of this invention, as defined in the claims, are intended to include all such embodiments.

We claim:

1. A system for delivering a preselected amount of a slurry, said system comprising:

a slurry reservoir;

a pump;

a slurry recirculation loop comprising outflow and return lines and a dispense section, said dispense section being bounded on either end by a dispense aperture;

means for alternately allowing or preventing flow in both of said outflow and return lines; and means for admitting a gas to said dispense section so as to expel said slurry through said dispense apertures while flow is prevented in said outflow and return sections.

2. The system of claim 1 wherein said slurry contains abrasive particles.

3. The system of claim 2 wherein each of said dispense apertures is connected to a slurry feed line, each of said slurry feed lines terminating in a slurry applicator.

4. The system of claim 3 wherein said gas is air and comprising an air supply line connected to said dispense section.

5. The system of claim 4 comprising a means for opening and closing said slurry feed lines and said air supply line simultaneously.

6. The system of claim 5 wherein said means for opening and closing comprises pinch valves in each of said slurry feed lines and said air supply line.

7. The system of claim 6 comprising a pinch bar for closing each of said pinch valves simultaneously.

8. The system of claim 7 comprising a pinch valve in each of said outflow and return lines.

9. The system of claim 8 wherein said pinch bar operates so as to close said pinch valves in said slurry feed lines and said air supply line while opening said pinch valves in said outflow and return lines, and to close said pinch valves in said outflow and return lines while opening said pinch valves in said slurry feed lines and said air supply line.

10. A method of delivering a preselected amount of a slurry, said method comprising:

providing a slurry recirculation loop and a pair of dispense lines extending from first and second points along said recirculation loop, said first and second points defining a dispense section of said loop;

recirculating a slurry in said loop;

causing said recirculation to terminate in said dispense section of said loop; and injecting a gas into said dispense section so as to expel the slurry in said dispense section through said dispense lines.

\* \* \* \* \*